2,964,552

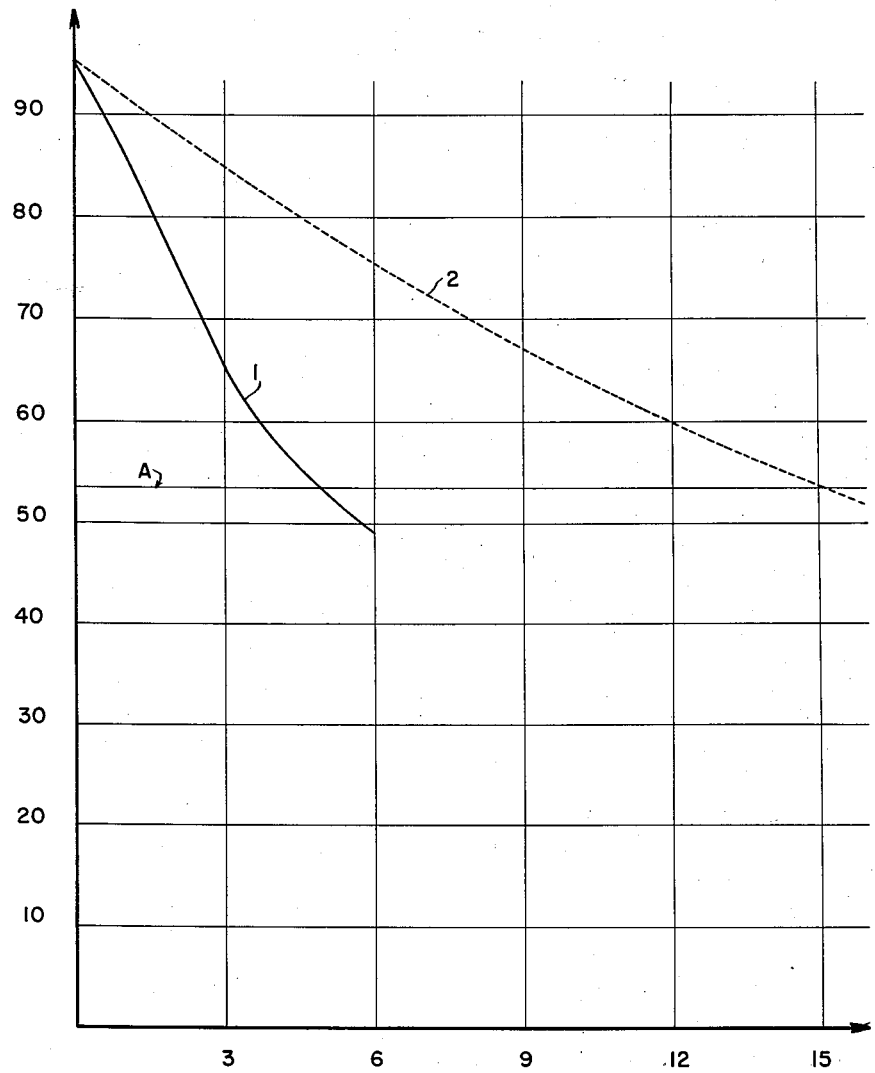
INVENTORS
KNUT BERTIL HÖGBERG
OVE BIRGER FERNÖ ations, and the molecular weight of 65
United States Patent Office 2,964,552
Patented Dec. 13, 1960

ADRENOCORTICOTROPIC ACTION-RETARDING AND ANTI-ENZYMATIC SUBSTANCES

Knut Bertil Högberg and Ove Birger Fernö, Halsingborg, Sweden, assignors to Aktiebolaget Leo (A/B Leo), Halsingborg, Sweden, a firm of Sweden Filed Aug. 31, 1956, Ser. No. 607,321

10 Claims. (Cl. 260—461)

This invention relates to new substances having a strong anti-enzymatic effect, especially against hyaluronidase which substances are useful, for example in prolonging and increasing the hormonal effect of the adrenocorticotropic hormone, said hormone being referred to hereinafter as "ACTH," and its ACTH-active peptides. In addition thereto our new substances possess other useful properties.

This application is a continuation in part of the co-pending application of Hans Jacob Fex, Torsten Ove Enok Linderot, Ernst Thomas Rosenberg and us, Serial Number 362,312, filed June 17, 1953, for Anti-Enzymatic Substances, and our co-pending application, Serial Number 362,402, filed June 17, 1953, for Preparations With Protracted ACTH-Effect.

Earlier investigation has shown that by phosphorylating di- and poly-hydroxy flavones or flavanones or di- and poly-hydroxy chalcones or their dihydro derivatives corresponding to the said dihydroxy or poly-hydroxy flavanones under suitable conditions more or less high molecular weight compounds are obtained which are formed as a result of a condensation polymerization. When dissociated in water wherein they are soluble at least at neutral to alkaline reaction they form negatively strongly charged ions. They are further characterized by having an anti-enzymatic effect on certain enzymes, particularly hyaluronidase.

It is an object of this invention to procure new substances having similar antienzymatic effects as the ones mentioned above, said new substances being condensation polymers derived from simpler parent compounds, and having at the same time the property of forming with ACTH and its active peptides compounds having a protracted ACTH-effect, superior to that of previously known compounds, for example those produced by combining ACTH and protamines.

Other objects and purposes of our invention will appear from the following.

The substances of our invention consist of phosphoric acid radicals which are interconnected through organic radicals to form molecular structures in which the said phosphoric acid radicals are linked through P—O-linkings with 1-3 binuclear aromatic radicals consisting of two benzene nuclei which are interconnected through a carbon bridge consisting of not more than two carbon atoms and in which aromatic radicals the oxygen atoms of the said P—O-linkings are present in the said benzene nuclei in para position to the bridge, the number of hydroxy groups of the phosphoric acid involved in the P—O-linkings being less than the total number of the hydroxy groups of the phosphoric acid radicals, and the molecular weight of the substance being higher than 2000 but not large enough to render the substance insoluble in aqueous alkali. Also salts of these substances are within the scope of our invention.

As it appears from the above general statement of our invention the parent compounds for our new substances contain two benzene nuclei which are interconnected through a carbon bridge consisting of not more than two carbon atoms each of which benzene nuclei possesses a hydroxy group in the para position to the bridge.

To illustrate the possibilities of the structural shape of our new substances, the product obtained by phosphorylating hydroquinone or resorcinol as a parent compound may be mentioned, for the sake of simplicity, although such products are not included in our present invention. This product consists mainly of chains of the type:

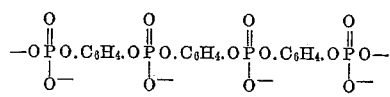

In these chains, however, the third valency of the phosphorus atoms, which in the shown formula is occupied by free hydroxy groups which are dissociated in solution, may in some cases be linked to hydroquinone or resorcinol, whereby the chains will be branched.

The preferred parent compounds for the condensation polymers of our invention are represented by the general formula

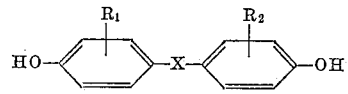

in which X is a carbon bridge having 1 to 2 carbon atoms and $R_1$ and $R_2$ each represents hydrogen or a methyl group.

In the carbon bridge hydrogen atoms at the carbon atom or atoms may be substituted by one or more alkyl, alkenyl or alkylidene groups, the number of carbon atoms in each such substituent being 1, 2 or 3 carbon atoms.

Examples of suitable organic parent compounds of the substances which form the subject matter of our present invention are 4,4'-dihydroxy-3-methyl - diphenylmethane, bis - (p - hydroxyphenyl) - isopropyl - methane, bis-(p-hydroxyphenyl) - ethylidene - methane, bis - (4 - hydroxy-3-methylphenyl)-ethyl-n-propyl-methane, 4,4'-dihydroxy-α-isopropylstilbene, 4,4'-dihydroxy-α-methyl-β-n-propylstilbene, 4,4'-dihydroxy-α-ethyl-β-propenylstilbene, 4,4'-dihydroxy-α-2-dimethyl-β-ethylstilbene, 4,4' - dihydroxy - α,β-3,3'-tetramethylstilbene, p,p'-dihydroxy - diphenylethane, 4,4'-dihydroxy-2-methyldiphenyl-α-methylethane, 4,4'- di-hydroxydiphenyl-α,α-dimethylethane, 4,4' - dihydroxy-α,β-bis-n-propyldiphenylethane, 4,4' - dihydroxy-α-2-dimethyl-β-ethyl-diphenylethane, 4,4'-dihydroxy-α-ethyl - β - ethylidene - diphenylethane, and 4,4' - dihydroxy-3,3'-dimethyl-γ,δ-diphenyl-β,δ-hexadiene.

Some of these compounds have an estrogenic and cytostatic effect.

It is of substantial importance for obtaining a high anti-enzymatic effect that the degree of polymerization of our new substances is sufficiently high. In accordance herewith the lower limit for the molecular weight is about 2000, which means that about 6-8 organic radicals are connected in the above mentioned way.

With a molecular weight of about 2000 the anti-enzymatic effect of our new substances is strong as compared with that of corresponding monomeric mono- and di-phosphates. By increasing the molecular weight to values between 10,000 and 30,000, which can be effected for instance by increasing the reaction time for the phosphorylation of the parent compound, products are obtained which do not dialyze through a cellophane membrane and which exert a much stronger anti-enzymatic effect. These high molecular weight substances are especially desired according to the present invention. By still increasing the time of reaction products of a still higher molecular weight are formed. The anti-enzymatic effect, however, does not increase further, and the molecular weight must not be so high so that the products are no longer soluble in aqueous alkali.

In the cases where the parent compounds have estrogenic or cytostatic effects our new substances prepared therefrom will show highly protracted effects and are useful injectable preparations as means for obtaining such effects in humans and animals. An estrogenic effect may also be advantageous in ACTH-active preparations.

To illustrate the protracted ACTH-effect obtainable the following may be mentioned.

By intramuscular administration of a suitable dose, for instance 20 I.U. of common ACTH, it will be found that the number of eosinophilic cells falls to a minimum during 2–4 hours, for instance to 36% of the value before the administration of ACTH. Already 8 hours after the injection, however, the number of eosinophilic cells has generally increased to 50% of the original value, and in the following 2 hours the amount of eosinophilic cells increases considerably. If, however, ACTH combined with one of our new substances is admniistered in an amount corresponding to 20 I.U. of ACTH the content of eosinophilic cells in the blood is falling during the first 4 hours just as before, but the number continues to diminish until after 8–14 hours it is down at a value, which in most cases is below 10% of the original value. Still 24 hours after the administration, the eosinophilic number has usually not increased to 50% of the original value. Correspondingly, it is possible by using a substance according to the invention to undertake successful clinic treatments with only one injection per 24 to 48 hours. Determined by the number of eosinophilic cells our new substances not only protract the ACTH-effect, but also increase the effect.

The antienzymatic properties of the substances prepared according to the invention depend mainly on their molecular weight. In the following these properties will be characterized by the figure which indicates, at a certain concentration, how many percent the substance in question inhibits the enzyme system hyaluronic acid-hyaluronidase.

As an indication of the inhibition there is in the following examples used "percent inhibition" calculated by the formula:

$$\text{Percent inhibition} = \frac{(H_2 - H_1) \cdot 100}{H_2}$$

where, in a given solution of hyaluronidase, $H_1$ is the reaction time necessary to halve the viscosity of a given solution of hyaluronic acid suitable as a substratum, whereas $H_2$ is the reaction time which is necessary to halve the viscosity when the hyaluronidase acts upon a mixture of the same solution of hyaluronic acid to which a substance with antihyaluronidase effect is added.

In the drawing curve 1 shows the relation between reaction time and viscosity when bovine hyaluronidase is used. Thereby 0.1 cc. of the enzyme solution is used, containing 2 V.R.U. (viscosity reducing unit, defined as the proportion of enzyme, which halves the viscosity of the substratum in question during 10 minutes). As a substratum there is used hyaluronic acid produced from umbilical cords after the method described by Jeanloz and Forchielli (Journ. of Biol. Chem. 186, 495 (1950)). The solution contains 0.3% of this hyaluronic acid in a McIlvaine's buffer mixture with pH=7. The enzyme solution is mixed with 3 ccs. of substratum and 0.9 cc. of buffer.

Curve 2 shows the relation between reaction time and viscosity for a similar mixture, which furthermore contains the substance, the antienzymatic effect of which is to be determined. The proportions of the mixture are: 0.1 cc. of enzyme, 0.7 cc. of buffer and 0.2 cc. of a neutral aqueous solution of the product whose antienzymatic effect is to be determined, and 3 ccs. of substratum.

$H_1$ and $H_2$ are determined by the points of intersection with the horizontal line A, the ordinate of which is half the sum of the traversion times of the buffer solution and the substratum diluted with buffer in the proportion 3:1, respectively.

We prepare our new substances by reacting a phosphorylating agent such as phosphorus oxychloride with one or more of the parent compounds under condensation conditions preferably using a tertiary amine as a hydrogen chloride-binding agent after which the resulting condensation products are subjected to hydrolysis. The said hydrolysis results in splitting off the groups, for instance chlorine atoms, which in the phosphorylating agent are linked to the phosphoric acid residue and which have not been replaced, during the condensation process, by the organic radicals. These halogen atoms are replaced by hydroxy groups whereby free phosphoric acid groups are formed so that one or two of the valencies of the phosphorus are linked with an organic group through an oxygen atom whereas the remaining one or two are linked to hydroxy groups. The products thereby become strongly acid and capable of forming salts of which the alkali salts are soluble.

During the phosphorylating the parent compounds may suitably be dissolved in a solvent which is not reacted upon by the phosphorylating agent. An appropriate manner of carrying out this method whereby products having considerable anti-enzymatic properties are particularly and certainly obtained is characterized in that suitable conditions for the condensation are maintained in the anhydrous medium by cooling during the phosphorylation, adding the phosphorylating agent or the condensation medium slowly, adding the same periodically, permitting the reaction mixture to stand for some time prior to hydrolysis, or by other similar methods until at least the desired degree of condensation is obtained and then interrupting the condensation. To obtain a sufficient condensation it is expedient to use not too great an excess of the phosphorylating agent, in the case of phosphoroxychloride, preferably 0.7–1.1 mols of the phosphorylating agent per mol of the parent compound. Therefore, it is expedient to add the phosphorylating agent to a solution of the parent compound and not the other way, since in the latter case the phosphorylating agent would be present in too great an excess at the beginning of the process.

Examples of suitable ketone solvents are methylethylketone, methyl-n-propylketone, diethylketone, hexanone-2, pinacolin, and di-n-propylketone. Examples of solvents containing chlorine are chloroform, ethylene chloride and ethylidene chloride. These and other solvents may be used alone or in mixtures. The solvent may also consist in the condensation agent used in the process, for instance a tertiary amine, among which pyridine, picoline, lutidine, quinoline and dimethylaniline are suitable. In certain cases it may, however be expedient to use such condensation agents mixed with indifferent solvents.

Since heat is evolved during the phosphorylation, it is generally suitable to cool fairly strongly in order to regulate the process.

It will generally be necessary to allow the reaction mixture to stand for shorter or longer periods before hydrolyzing in order that the condensation may attain the degree desired in the final product. In many cases it is expedient to leave the reaction mixture standing at room temperature, abt. 15–20° C. for ½ to 24 hours. This period of standing may be reduced by increasing the temperature, and generally there seems to be no disadvantage in increasing the temperature to abt. 50° C. during the period of standing.

The reaction is then terminated by diluting the reaction mixture with ice water whereby also any excess of phosphorylating agent is destroyed.

In the following a number of examples of the production of different substances according to the invention will be given.

Example 1

2.28 g. 4,4'-dihydroxy-diphenyl-dimethyl-methane are dissolved in 20 ccs. of anhydrous pyridine. At −15° C. a solution of 0.62 cc. phosphorous oxychloride in 5 ccs. of anhydrous pyridine is added dropwise with shaking. Time of addition: 3 minutes. By the addition an insignificant heating is observed. After 2 hours in a cooling bath a large amount of pyridinium chloride crystals has precipitated. The mixture is then kept at 0° C. during 15 hours, whereafter it has become viscous. It is then hydrolysed with finely crushed ice, whereby a clear solution as well as a viscous mass is obtained. To the mixture 75 ccs. of 5 N hydrochloric acid are added, whereby a precipitate is formed in the clear solution, and the viscous mass becomes solid and disintegrates to a powder. The precipitate is filtered off and dissolved in 5 N solution of sodium hydroxide. After shaking up repeatedly with ether, hydrochloric acid in excess is added to the alkaline aqueous solution, whereby a white, finely grained precipitate is formed which is filtered off, washed with water and dried. Yield 3.2 g. White fine-grained powder, insoluble in a solution of sodium bicarbonate, soluble in sodium hydroxide solution. Inhibition (0.2γ/4 ccs.): 82%.

Example 2

2.98 g. of bis-(4-hydroxy-3-methylphenyl)-ethyl-n-propylmethane are dissolved in 100 ccs. of anhydrous pyridine. At −15° C. a solution of 0.92 cc. of phosphorus oxychloride in 10 ccs. of anhydrous pyridine is added dropwise with shaking. Time of addtiion 5 minutes. After 1 hour in the cooling bath and 20 hours at room temperature the clear solution is hydrolyzed with crushed ice and evaporated in vacuum. The residue is dissolved in 20 ccs. of 1 N sodium hydroxide solution and the solution obtained is added with stirring to 25 ccs. of 5 N hydrochloric acid whereby a white precipitate is obtained. Yield after drying: 3.9 g. Inhibition (10γ/4 ccs.): 77%.

Example 3

2.14 g. of p,p'-dihydroxy-diphenyl-ethane are dissolved in 20 ccs. of anhydrous pyridine. At −15° C. a solution of 0.62 cc. of phosphorous oxychloride in 5 ccs. of anhydrous pyridine is added dropwise with shaking. Time of adidtion: 3 minutes. At the addition an insignificant heating takes place. After some hours in the cooling bath a copius precipitate of pyridinium chloride has formed. The mixture is then left for 15 hours at 0° C., whereafter its consistency is jelly-like. It is then hydrolysed with finely crushed ice, whereby a clear solution is obtained. To this solution 75 ccs. of 5 N hydrochloric acid are added. Thereby a fine-grained precipitate is obtained which is removed by suction, washed with water and dried in an exsiccator over phosphorus pentoxide. Almost white powder, yield 2 g. The product is difficultly soluble in a solution of sodium bicarbonate but easily soluble in a solution of sodium hydroxide. Inhibition (20γ/4 ccs.): 93%.

Example 4

2.7 g. of 3,4-bis-(p-hydroxy-phenyl)-hexane are dissolved in 120 ccs. of anhydrous pyridine. At −15° C. a solution of 0.92 cc. of phosphorous oxychloride in 10 ccs. of anhydrous pyridine is added dropwise with shaking. Time of addition 5 minutes. After 1 hour in the cooling bath and 20 hours at room temperature the clear solution is hydrolyzed with crushed ice and evaporated in vacuum. The residue is dissolved in 20 ccs. of 1 N sodium hydroxide solution and the solution obtained is added with stirring to 25 ccs. of 5 N hydrochloric acid whereby a white precipitate is obtained. Yield after drying: 3.3 g. Inhibition (8γ/4 ccs.): 60%.

Example 5

2.42 g. of 4,4'-dihydroxy-2-methyldiphenyl-α-methylethane are dissolved in 30 ccs. of anhydrous pyridine. At −15° C. a solution of 0.92 cc. of phosphorus oxychloride in 5 ccs. of anhydrous pyridine is added dropwise with shaking. Time of addition 3 minutes. The mixture is left for 20 hours at room temperature, after which time it has become jellylike. It is then hydrolyzed with crushed ice, and warmed to 85° C. for 2 hours whereby a clear solution is obtained. This is evaporated in vacuum, the residue is dissolved in 20 ccs. of 1 N sodium hydroxide solution and the solution obtained is added with stirring to 25 ccs. of 5 N hydrochloric acid whereby a white precipitate is obtained. Yield after drying: 2.9 g. Inhibition (4γ/4 ccs.): 50%.

Example 6

1.33 g. of 4,4'-dihydroxy-γ-δ-diphenyl-β-δ-hexadiene are dissolved in 20 ccs. of anhydrous pyridine. The solution is cooled to −14° C., whereafter a solution of 0.31 cc. of phosphorus oxychloride in 5 ccs. of anhydrous pyridine is added dropwise with shaking. Time of addition: 3 minutes. At the addition an insignificant heating occurs. The mixture is left for a further 3 hours in the cooling bath and then for 20 hours at 0° C. After this time the mixture has become jelly-like. It is then hydrolysed with finely crushed ice, whereby a clear solution is obtained. To this solution 75 ccs. of 5 N hydrochloric acid are added, whereby after drying 1.6 g. of a light beige (cream coloured) powder is obtained. This product is difficultly soluble in a solution of sodium bicarbonate but easily soluble in sodium hydroxide. Inhibition (20γ/4 ccs.): 95%.

Example 7

2.94 g. of 4,4'-dihydroxy-3,3'-dimethyl-γ,δ-diphenyl-β,δ-hexadiene are dissolved in 60 ccs. of anhydrous pyridine. At −15° C. a solution of 1 cc. of phosphorus oxychloride in 10 ccs. of anhydrous pyridine is added dropwise with shaking. Time of addition 5 minutes. The mixture is left for 1 hour in the cooling bath and then for 24 hours at room temperature. It is then hydrolysed with finely crushed ice whereby a clear solution is obtained. This is evaporated in vacuum to ¼ of the volume. The viscous residue is dissolved in about 40 ccs. of 1 N sodium hydroxide solution (to pH 7). The solution is dialyzed against flowing water for 5 days and is then added with stirring to 20 ccs. of 5 N hydrochloric acid whereby a white precipitate is obtained. This is removed by suction and washed with water whereafter it is dried in a vacuum exsiccator over phosphorus pentoxide. Yield 3.5 g. Inhibition (3γ/4 ccs.): 45%.

Example 8

13.3 g. of 4,4'-dihydroxy-α,β-diethylstilbene are dissolved in 300 ccs. of anhydrous pyridine. At −15° C. a solution of 5.0 ccs. of phosphorus oxychloride in 35 ccs. of anhydrous pyridine is added dropwise with shaking. Time of addition 15 minutes. The mixture is left for 1 hour in the cooling bath and then for 20 hours at room temperature. It is then hydrolyzed with 200 g. of finely crushed ice whereby a clear solution is obtained. This is evaporated in vacuum to ¼ of the volume. The viscous residue is dissolved in about 200 ccs. of 1 N sodium hydroxide solution (to pH 7). The solution is dialyzed against flowing water for 5 days and is then added with stirring to 60 ccs. of 5 N hydrochloric acid whereby a white precipitate is obtained. This is removed by suction and washed with water whereafter it is dried in a vacuum exsiccator over phosphorus pentoxide. Yield 16.1 g. of a white powder which is easily soluble in sodium hydroxide solution. Inhibition (4γ/4 ccs): 51%.

Example 9

2.68 g. of 4,4'-dihydroxy-δ-methyl-β-n-propylstilbene are dissolved in 30 ccs. of anhydrous pyridine. At −10° C. a solution of 0.92 cc. of phosphorus oxychloride in 5 ccs. of pyridine is added dropwise with shaking. Time of addition 2 min. The mixture is left for 20 hours at room temperature, after which time it has become jelly-like. It is then hydrolysed with crushed ice, and left at room temperature for 3 days whereby a clear solution is obtained. To this solution 150 ccs. of 5 N hydrochloric acid are added. Yield after drying 3.1 g. of a white powder. Inhibition (5γ/4 ccs): 49%.

*Example 10*

2.54 g. of 4,4′-dihydroxy-α-isopropylstilbene are dissolved in 60 ccs. of anhydrous pyridine. At −15° C. a solution of 1.2 ccs. of phosphorus oxychloride in 10 ccs. of anhydrous pyridine is added dropwise with shaking. Time of addition 5 minutes. After 1 hour in the cooling bath and 20 hours at room temperature the clear solution is hydrolyzed with crushed ice and evaporated in vacuum. The residue is dissolved in 20 ccs. of N sodium hydroxide solution and the solution obtained is added with stirring to 25 ccs. of 5 N hydrochloric acid whereby a white precipitate is obtained. Yield after drying: 3.0 g. Inhibition (4γ/4 ccs.): 60%.

*Example 11*

2.80 g. of 4,4′-dihydroxy-α-ethyl-β-propenylstilbene are dissolved in 60 ccs. of anhydrous pyridine. At −15° C. a solution of 0.83 cc. of phosphorus oxychloride in 5 ccs. of anhydrous pyridine is added dropwise with shaking. Time of addition 3 minutes. After 1 hour in the cooling bath and 5 hours at room temperature the clear solution is hydrolyzed with crushed ice and evaporated in vacuum. The residue is dissolved in 20 ccs. of 1 N sodium hydroxide solution and the solution obtained is added with stirring to 25 ccs. of 5 N hydrochloric acid whereby a white precipitate is obtained. Yield after drying: 3.4 g. Inhibition (5γ/4 ccs.): 45%.

*Example 12*

2.68 g. of 4,4′-dihydroxy-α,β,2,2′-tetramethylstilbene are dissolved in 30 ccs. of anhydrous pyridine. At −15° C. a solution of 0.69 cc. phosphorus oxychloride in 5 ccs. of anhydrous pyridine is added dropwise with shaking. Time of addition 3 minutes. The mixture is left for 20 hours at room temperature, after which time it has become jelly-like. It is then hydrolyzed with crushed ice, and warmed to 85° C. for 2 hours whereby a clear solution is obtained. This is evaporated in vacuum, the residue is dissolved in 20 ccs. of 1 N sodium hydroxide solution and the solution obtained is added with stirring to 25 ccs. of 5 N hydrochloric acid whereby a white precipitate is obtained. Yield after drying: 2.9 g. Inhibition (12γ/4 ccs.): 42%.

We claim:

1. A polymeric product, having adrenocorticotropic action-retarding and antienzymatic properties, selected from the group consisting of:

(1) a polymeric poly-phenol-phosphate condensation product,

*a.* containing unesterified hydroxy groups attached to phosphorous atoms,

*b.* having a molecular weight above 2,000, and

*c.* being soluble in aqueous alkali,

*d.* said product being produced by (I) condensing, under substantially anhydrous conditions at a reaction temperature up to about room temperature and in the presence of a tertiary amine as an acid-binding agent, a phosphorus oxyhalide and a starting phenol compound of the general formula:

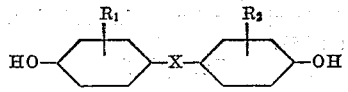

wherein X represents a carbon bridge of 1 carbon atom, which is a part of a hydrocarbon chain of from one to eight carbon atoms, inclusive, and wherein $R_1$ and $R_2$ are selected from the group consisting of hydrogen and methyl, the molar ratio of phosphorus oxyhalide to starting phenol being in excess of that theoretically required to react all of the hydroxy groups of the starting phenol with halogen atoms of the phosphorus oxyhalide, to produce a poly-phenolphosphate polymer having a molecular weight in excess of 2,000 in which halogen atoms remain attached to phosphorus atoms, and (II) hydrolyzing with water the thus-produced halogen-containing polymer to replace residual halogen atoms therein by hydroxy groups and thereby render the poly-phenol-phosphate polymer of an acidic nature and soluble, at least in aqueous alkali, and (2) salts thereof.

2. A polymeric product, having adrenocorticotropic action-retarding and antienzymatic properties, selected from the group consisting of:

(1) a polymeric poly-phenol-phosphate condensation product,

*a.* containing unesterified hydroxy groups attached to phosphorus atoms,

*b.* having a molecular weight above 2,000, and

*c.* being soluble in aqueous alkali,

*d.* said product being produced by (I) condensing, under substantially anhydrous conditions at a temperature up to about 50° centigrade and in the presence of a tertiary amine as an acid-binding agent, a phosphorus oxyhalide and a starting phenol compound of the general formula:

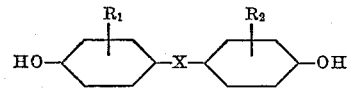

wherein X represents a carbon bridge of 2 carbon atoms which is a part of a hydrocarbon chain of from two to eight carbon atoms, inclusive, and wherein $R_1$ and $R_2$ are selected from the group consisting of hydrogen and methyl, the molar ratio of phosphorus oxyhalide to starting phenol being in excess of that theoretically required to react all of the hydroxy groups of the starting phenol with halogen atoms of the phosphorus oxyhalide, to produce a poly-phenol-phosphate polymer having a molecular weight in excess of 2,000 in which halogen atoms remain attached to phosphorus atoms, and (II) hydrolyzing with water the thus-produced halogen-containing polymer to replace residual halogen atoms therein by hydroxy groups and thereby render the poly-phenol-phosphate polymer of an acidic nature and soluble, at least in aqueous alkali, and (2) salts thereof.

3. A product as claimed in claim 2, wherein up to two substituents selected from the class consisting of alkyl, alkenyl and alkylidene groups having up to and including three carbon atoms each are attached to the carbon bridge.

4. A polymeric product, having adrenocorticotropic action-retarding and antienzymatic properties, selected from the group consisting of:

(1) a polymeric poly-phenol-phosphate condensation product,

*a.* containing unesterified hydroxy groups attached to phosphorus atoms,

*b.* having a molecular weight above 2,000, and

*c.* being soluble in aqueous alkali,

*d.* said product being produced by (I) condensing, under substantially anhydrous conditions at a temperature up to about 50° centigrade and in the presence of a tertiary amine as acid-binding agent, a phosphorus oxyhalide and a starting phenol compound of the general formula:

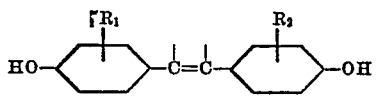

wherein the

bridge is a part of a hydrocarbon chain of from two to eight carbon atoms, inclusive, and wherein $R_1$ and $R_2$ are selected from the group consisting of hydrogen and methyl, the molar ratio of phosphorus oxyhalide to starting phenol being in excess of that theoretically required to react all of the hydroxy groups of the starting phenol with halogen atoms of the phosphorus oxyhalide, to produce a poly-phenol-phosphate polymer having a molecular weight in excess of 2,000 in which halogen atoms remain attached to phosphorus atoms, and (II) hydrolyzing with water the thus-produced halogen-containing polymer to replace residual halogen atoms therein by hydroxy groups and thereby render the poly-phenol-phosphate polymer of an acidic nature and soluble, at least in aqueous alkali, and (2) salts thereof.

5. A polymeric product, having adrenocorticotropic action-retarding and antienzymatic properties, selected from the group consisting of:

(1) a polymeric poly-phenol-phosphate condensation product, a. containing unesterified hydroxy groups attached to phosphorus atoms, b. having a molecular weight above 2,000, and c. being soluble in aqueous alkali, d. said product being produced by (I) condensing, under substantially anhydrous conditions at a temperature up to about room temperature and in the presence of pyridine as an acid-binding agent, phosphorus oxychloride and a starting phenol compound of the general formula:

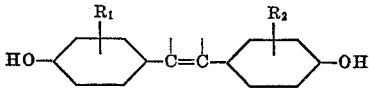

wherein the

bridge is a part of a hydrocarbon chain of from two to eight carbon atoms, inclusive, and wherein $R_1$ and $R_2$ are selected from the group consisting of hydrogen and methyl, the molar ratio of reactants being at least 0.7 mole of phosphorus oxychloride per mole of starting phenol, such molar ratio being in excess of that theoretically required to react all of the hydroxy groups of the starting phenol with halogen atoms of the phosphorus oxychloride, to produce a poly-phenol-phosphate polymer having a molecular weight in excess of 2,000 in which chlorine atoms remain attached to phosphorus atoms, and (II) hydrolyzing with ice water the thus-produced chlorine-containing polymer to replace residual chlorine atoms therein by hydroxy groups and thereby render the poly-phenol-phosphate polymer of an acidic nature and soluble, at least in aqueous alkali, and (2) salts thereof.

6. A substance as claimed in claim 2, in which the phenol is 4,4'-dihydroxy-γ,δ-diphenyl-β,α-hexadiene.

7. A substance as claimed in claim 2, in which the phenol is 3,4-bis-(p-hydroxyphenyl)-hexane.

8. A substance as claimed in claim 5, in which the phenol is 4,4'-dihydroxy-α,β-diethyl-stilbene.

9. A substance as claimed in claim 2, in which the phenol is 3,3'-dimethyl-4,4'-dihydroxy-γ,δ-diphenyl-β,δ-hexadiene.

10. A substance as claimed in claim 5, in which the phenol is 4,4'-dihydroxy-α,β-2,2'-tetramethyl-stilbene.

References Cited in the file of this patent

UNITED STATES PATENTS

| | | |
|---|---|---|
| 2,058,394 | Arvin | Oct. 27, 1936 |
| 2,272,668 | Hoenel | Feb. 10, 1942 |
| 2,743,258 | Coover | Apr. 24, 1956 |